F. J. HREJSA, DEC'D.
L. HREJSA, ADMINISTRATRIX.
VEHICLE FENDER.
APPLICATION FILED DEC. 4, 1912. RENEWED MAR. 2, 1916.
1,182,012. Patented May 9, 1916.
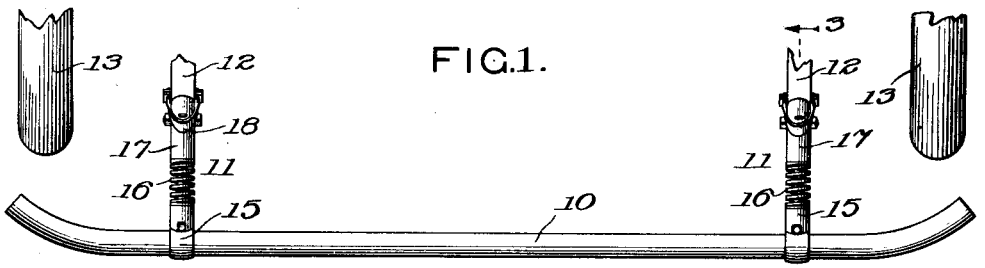
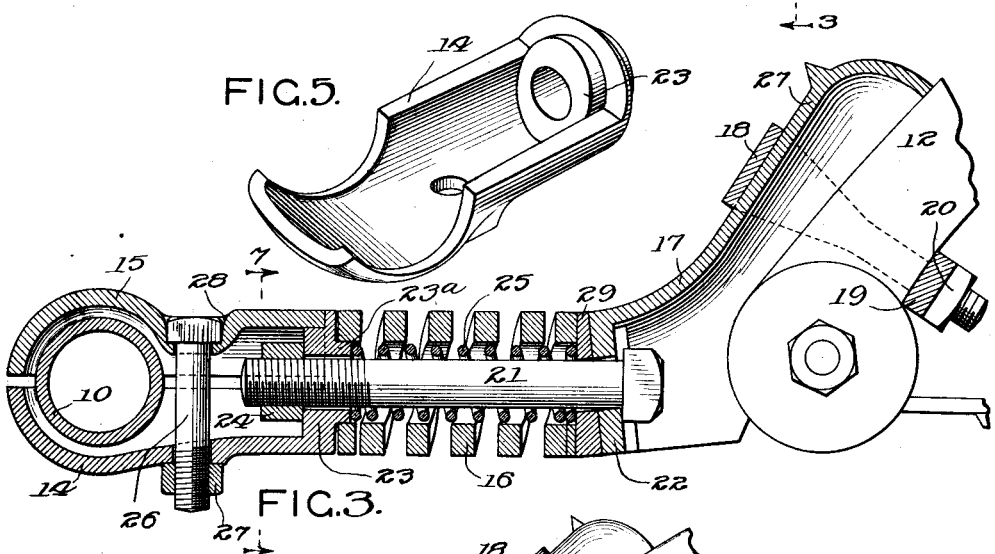
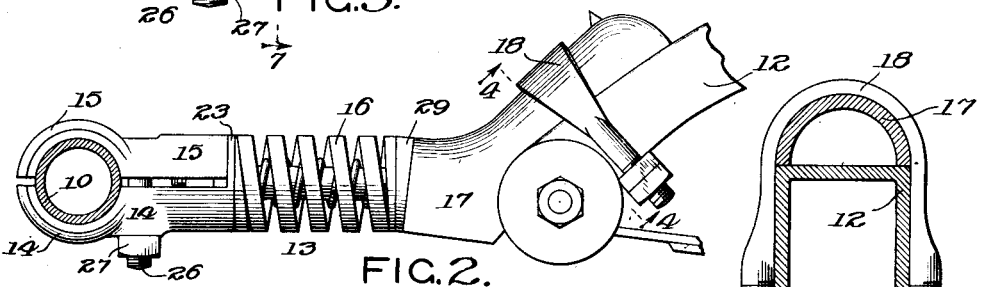
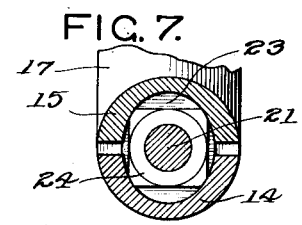
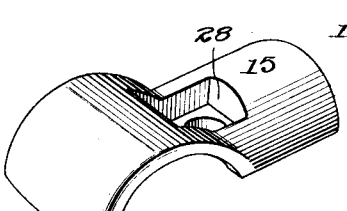
Witnesses:
Inventor:
Frank J. Hrejsa

UNITED STATES PATENT OFFICE.

FRANK J. HREJSA, OF CHICAGO, ILLINOIS; LILLIAN M. HREJSA, OF CHICAGO, ILLINOIS, ADMINISTRATRIX OF SAID FRANK J. HREJSA, DECEASED.

VEHICLE-FENDER.

1,182,012. Specification of Letters Patent. Patented May 9, 1916.

Application filed December 4, 1912, Serial No. 734,806. Renewed March 2, 1916. Serial No. 81,754.

*To all whom it may concern:*

Be it known that I, FRANK J. HREJSA, a citizen of the United States, residing at Chicago, in the county of Cook and State of Illinois, have invented certain new and useful Improvements in Vehicle-Fenders, of which the following is a specification.

One of the objects of this invention is to produce an improved fender which may be quickly attached to different styles of cars without alterations in the car or in the means for attaching the fender.

Another object is to provide a fender which comprises means for compensating for the different shapes of the frames of automobiles for the purpose of causing the attaching members for the impact bar to extend in a horizontal plane.

A further object is to provide a fender which is more conveniently attachable than those heretofore produced. To this end the bearings in the two attaching devices for the impact bar are made separable so that the attaching devices may first be individually attached to the automobile frame and the impact bar then mounted on said attaching devices. The fender herein shown may be assembled and attached to the car by any ordinary person and by the use of a simple tool such as an ordinary wrench.

My invention also contemplates the provision of a fender which is extremely simple and strong, and many of the parts of which are of standard size and shape such as may be found on the market.

Other objects and advantages of the invention will be apparent from the following description.

In the accompanying drawings, Figure 1 is a plan view of a fender complete which embodies the features of my invention. Fig. 2 is a side view of one of the buffer devices which connects the impact bar with the frame of the vehicle. Fig. 3 is an enlarged vertical longitudinal section of a connecting device slightly different from that shown in Fig. 2. Fig. 4 is a transverse section along the lines 4 4 of Fig. 2. Figs. 5 and 6 are complementary clamping members which connect the impact bar with the buffer. Fig. 7 is a section on line 7 7 of Fig. 3.

The illustrative embodiment of my invention which I have herein shown comprises a horizontal impact bar 10 which extends transversely in front of the automobile and is supported by a pair of substantially identical attaching devices 11 which are adapted to be mounted upon the forward ends of the frame members 12 of the automobile. The wheels of the car are indicated at 13 in Fig. 1.

Each of the attaching devices 11 comprises a pair of bar-clamping members 14 and 15, a buffer spring 16, and a frame-engaging member 17. A U-bolt 18 coöperating with a cross-piece 19 and nuts 20 clamps the member 17 to the frame 12. The member 17 is preferably somewhat wedge-shaped to prevent it from slipping downwardly between the frame member 12 and the clamping bolt 18. A bolt 21 passes through the transverse end wall 22 of the member 17, through the buffer spring 16 and the transverse end wall 23 of the lower clamping member 14 and thus connects the parts of the attaching device 11, said parts being clamped together by means of a nut 24 on said bolt. The forward end of the buffer spring fits upon an annular boss 23ª on the wall 23 of the part 14. The buffer spring exerts its pressure between the member 17 and the clamp-section 14, said clamp-section being thus supported upon the forward end of the buffer spring. This conduces to simplicity since it obviates the necessity for special means to support the clamping device. A coiled wire spring 25 surrounding the bolt 21 within the buffer spring 16 serves as an expansible and contractible filler to take up the space between the bolt and said buffer spring.

The clamping members 14 and 15 have complementary recesses in their forward ends to receive the impact bar, and said clamping members are drawn together to grip the impact bar 10 between them by means of a bolt 26 having a nut 27 threaded on its lower end. The head of the bolt 26 is adapted to fit in a recess 28 on the upper side of the clamping member 15 to prevent turning of the bolt.

As is well known, the frame members 12 of different styles of motor cars vary in the angle at which they extend with respect to a horizontal plane. The forward portions of the attaching devices 11 should of course lie in a horizontal plane. And to insure that said portions shall occupy this position I find it desirable in the manufacture of the fender to make the frame-engaging member 17 of the fender in two or more shapes, in order that there may be a member which will approximately fit each of the various styles of cars. In these different shapes of frame-engaging members the angle of the body of the members with respect to the end wall 22 will vary in accordance with the different angles of frame members on the various cars, so that when mounted in place the end wall will extend approximately vertical. Even when the attaching member most nearly adapted for a particular car is used, it sometimes happens that said end wall is not exactly vertical and consequently the forward portion of the fender is not held in a horizontal plane, and I have therefore provided means for compensating for the slight differences not taken care of by the frame-engaging member 17. Said means comprises a washer 29 surrounding the bolt 21, said washer having a beveled side, or in other words, the sides of the washer being non-parallel. Obviously, by positioning the thicker side of this washer either at the upper or lower side of the attaching device the relative position of the forward portion thereof with respect to the horizontal may be adjusted. In Figs. 2 and 3 I have illustrated two slightly different shapes of frame members 17 and have shown in Fig. 2 the washer 29 positioned with its thicker side uppermost, whereas, in Fig. 3 said washer occupies an opposite relative position, the result in both cases being the same, namely to cause the forward portion of the attaching device to extend in a horizontal plane.

In attaching the fender to an automobile the bolt 21 will be inserted through the opening in the end wall of the frame-engaging member 17 and the latter will then be clamped to the frame member 12. The washer 29, springs 25 and 16, and bar-clamping member 14 will then be successively passed over the bolt and finally the nut 24 applied. The head of the bolt 21 is held from turning by engagement of the side walls of the frame-engaging portion 17 and likewise the walls of the lower clamping member 14 may be made of such shape and dimension as to prevent the nut 24 from turning with relation thereto, so that by merely turning said clamping member the nut may be threaded onto the bolt 21 and the tension of the buffer spring 16 adjusted to the desired degree. When both of the attaching devices have been assembled thus far, the impact bar 10 will be laid in the recesses in the lower clamping members 14 and the top clamping members 15 applied. The bolts 26 will then be inserted and the nuts 27 turned up to firmly clamp the impact bar in place. It will be noted that in assembling the devices the association of the impact bar with the attaching members is one of the last steps. This conduces greatly to convenience in the attachment since it obviates the necessity of handling the entire fender while the frame-engaging portions are being clamped to the frame.

It will also be noted that many of the parts of the device such as the bolts and nuts and the coiled springs are of standard shape, especially shaped parts being used only where necessary. Such standard parts will be found upon the market and may be bought cheaply in large quantities, so that the cost of making the fender is thus reduced.

It will further be seen that it requires only a simple tool such as the ordinary wrench to attach the fender complete, the wrench being required only to tighten up the nuts 20 and 27. In every instance the head of the bolt is prevented from turning so that only a single wrench is needed.

While I have herein described the present embodiment in considerable detail, I do not limit myself to the precise construction disclosed, as modifications within the scope of the appended claims may be made.

I claim as my invention:

1. In a vehicle fender, bar-clamping means, and means for attaching said fender to a frame, each of said means having a transverse wall, a helical spring positioned longitudinally between said walls, a washer thinner at one edge than at the opposite edge positioned between said spring and the wall of said attaching means, said washer determining the angle between the attaching means and the spring, and means passing through said spring and said washer for connecting said walls.

2. In a vehicle fender, a frame-attaching means, a bar-clamping means, a buffer spring positioned between said means, a bolt connecting said means, the walls of said attaching means preventing rotation of the head of said bolt, and the walls of said clamping means preventing relative rotation therewith of the nut of said bolt.

3. In a vehicle fender, an attaching member having a front wall provided with an opening, a bolt extending through said opening which is enlarged to permit the bolt and the member to assume different angles with respect to each other, a bar, a clamp connection between the bar and the outer end of the bolt, and a spring coiled around the bolt in tension between said front wall and said connection, and supporting the bar in adjusted position.

4. In a vehicle fender, an attaching member; means for securing said member to the vehicle, said member having an end wall; a bar-clamp having an end wall; a coiled spring interposed between said end walls; and a bolt freely slidable in openings in said end walls, said bolt having two projections, to wit, a head and a nut, one of said projections bearing against the rear side of the first mentioned end wall and the other projection bearing against the forward side of the second mentioned end wall, said spring being held under tension by said bolt, and the bar clamp being supported from the attaching member through the reaction of the spring, said attaching member preventing rotation of one of said projections, and said bar-clamp preventing relative rotation therewith of the other projection.

5. In a vehicle fender, an attaching member, a bar-holding member, a spring in compression between said members, and supporting the bar holding member, a tension device connecting said members, to hold the spring in compression, and means between the end of the spring and the attaching member, adjustable to present a vertical pace to the end of the spring, whereby the spring will support the bar holding member in horizontal position, irrespective of the angle of the attaching member.

In testimony whereof I hereto affix my signature in presence of witnesses.

FRANK J. HREJSA.

Witnesses:
L. CAPEK,
JOSEPH F. HREJSA,
EARL C. CARLSON,
GEORGE L. CHINDAHL.

Copies of this patent may be obtained for five cents each, by addressing the "Commissioner of Patents, Washington, D. C."